(12) United States Patent
Davari et al.

(10) Patent No.: US 9,390,381 B2
(45) Date of Patent: Jul. 12, 2016

(54) INTELLIGENT WATER HEATER CONTROLLER

(71) Applicants: Shahram Davari, Los Altos, CA (US); Behnam Salemi, San Diego, CA (US)

(72) Inventors: Shahram Davari, Los Altos, CA (US); Behnam Salemi, San Diego, CA (US)

( * ) Notice: Subject to any disclaimer, the term of this patent is extended or adjusted under 35 U.S.C. 154(b) by 256 days.

(21) Appl. No.: 13/999,869

(22) Filed: Mar. 31, 2014

(65) Prior Publication Data

US 2015/0276265 A1    Oct. 1, 2015

(51) Int. Cl.
*F24H 9/20*    (2006.01)
*G05B 15/02*    (2006.01)
*H04L 29/08*    (2006.01)
*G06N 99/00*    (2010.01)
*H04L 12/28*    (2006.01)

(52) U.S. Cl.
CPC ............ *G06N 99/005* (2013.01); *F24H 9/2035* (2013.01); *H04L 12/2818* (2013.01); *H04L 67/025* (2013.01); *H04L 2012/285* (2013.01)

(58) Field of Classification Search
None
See application file for complete search history.

(56) References Cited

U.S. PATENT DOCUMENTS

| | | | | |
|---|---|---|---|---|
| 6,989,514 B2 * | 1/2006 | Patterson | ................ | G01K 7/42 219/485 |
| 8,660,701 B2 * | 2/2014 | Phillips | ................ | F24H 9/2014 219/508 |
| 9,103,550 B2 * | 8/2015 | Arensmeier | ............ | F23N 5/242 |
| 2005/0077368 A1 * | 4/2005 | Zak | ........................ | F24H 9/2035 237/19 |
| 2009/0090788 A1 * | 4/2009 | Roques | ..................... | F24H 1/20 236/20 R |
| 2011/0044671 A1 * | 2/2011 | Amiran | ............... | F24D 17/0031 392/441 |
| 2012/0024968 A1 * | 2/2012 | Beyerle | .............. | G05D 23/1346 236/12.11 |
| 2012/0271465 A1 * | 10/2012 | Zobrist | .................. | G05D 23/19 700/282 |
| 2013/0327313 A1 * | 12/2013 | Arnold | ................... | F24H 9/2007 126/344 |
| 2013/0327843 A1 * | 12/2013 | Monetti | ............. | G05D 23/1951 237/8 A |
| 2014/0229022 A1 * | 8/2014 | Deivasigamani | .... | G05D 7/0629 700/282 |
| 2014/0277817 A1 * | 9/2014 | Stevens | .............. | G05D 23/1917 700/300 |
| 2015/0088272 A1 * | 3/2015 | Drew | ...................... | H04L 67/10 700/12 |

* cited by examiner

Primary Examiner — Kenny Lin

(57) ABSTRACT

This invention describes an intelligent water heater controller that can use many inputs to learn the behavior of user over time. The controller is then able to predict when hot water is required and is able to turn the water heater on or off intelligently or to increase or reduce the water heating element so that the hot water is available when needed while reducing the energy consumption. User is able to communicate with the water heater controller via smart phone, tablet or computer remotely and change and parameter or configuration of the controller. The controller is also able to communicate events to the user's smart phone, tablet or computer.

8 Claims, 6 Drawing Sheets

INTELLIGENT WATER HEATER CONTROLLER

BACKGROUND OF THE INVENTION

Today's water heaters are simple appliances without any intelligence. They are always on and try to maintain the water temperature constant to a pre-set value at all times. This consumes a lot of energy. However the hot water is not used for a large part of the day or week. For example hot water is not required when people are sleeping or are at work or when they go to vacation. In order to save energy, a solution is required to turn the water heater off when hot water is not needed and turn the water heater on at the right time to heat the water and have it ready when hot water is needed. One way to solve this problem is to have a programmable Thermostat for water heater that can turn the water heater on/off at pre-configured times. Such a solution, although better than the always-on water heaters, is not ideal, since the hot water usage pattern may change over time that would require re-programming of the timer. For example, hot water usage during the workdays of the week is different from the weekends and holidays. Also, the hot water usage during summer is less than the usage during winter since people usually take cold showers and the water is also normally warm.

The water heater Thermostat's usually have Vacation setting that keeps the water at a lower temperature in order to save energy. However in most cases the users may forget to set the water heater thermostat to the Vacation setting before going on vacation. Therefore, the ability to remotely control and monitor the water heater temperature via devices such as smart phones or computers will further increase the efficiency of the water heater by conserving energy.

In general an intelligent water heater will be one of the components of intelligent homes, in which the devices, appliances and sensors can communicate with each other and the user to provide intelligent, dynamic and optimal settings that saves time and energy for the user and allow users better control and monitoring.

SUMMARY OF THE INVENTION

This invention describes an intelligent water heater controller that can use many inputs to detect the presence of the hot water users and can learn the behavior of user over time and can use the events in the user calendar to determine when and how much hot water is required.

This invention also describes communication between users and the intelligent water heater controller wired or wirelessly that allows the users to control the water heater controller and allows the water heater controller to provide on-demand or proactive status and diagnostics information to the user.

This invention also describes self-calibration of the water heater controller, where depending on the indoor or outdoor temperature the water heater controller can learn the temperate drop rate over time and can compensate for the amount of time that is required for heating the water.

This invention also describes adjusting the heating elements power to control the rate of the hot water temperate rise.

DETAILED DESCRIPTION OF THE PREFERRED EMBODIMENTS

Figure 1:
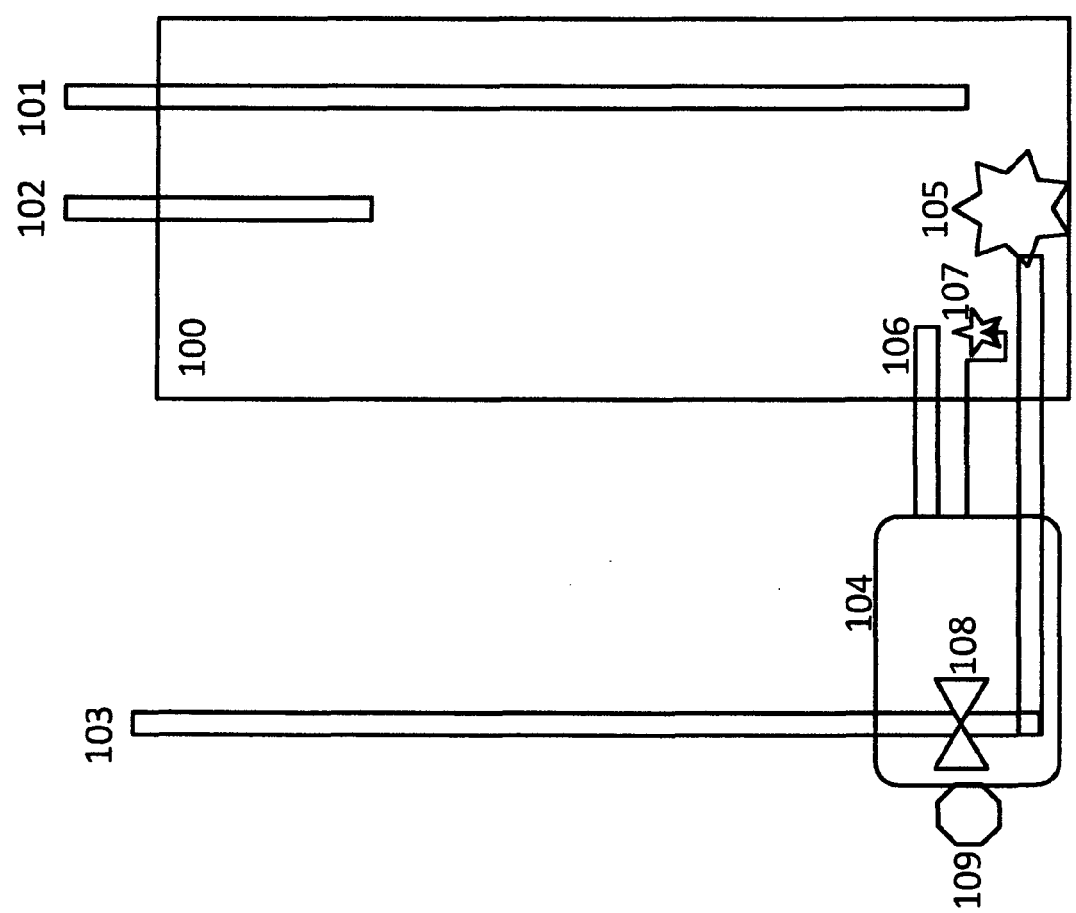
FIG. 1 is a schematic diagram of a standard water heater with a thermostat that turns the water heater on/off based on a preset temperature.

FIG. 1 shows a conventional water heater. It comprises of a water tank (100), a thermostat (104), a gas burner/electric heater (105), thermo-coupler (106) and a pilot and electric igniter (107). In addition a gas pipe (103) is connected to the thermostat (104) and a gas valve (108) that controls the flow of gas from main gas pipe (103) to the burner (105). The hot water pipe (102) and cold water pipe (101) run into the water tank (100). The thermostat (104) has a temperature control knob (109) that sets the maximum temperature of the water. The thermostat (104) measures the water temperature via the thermo-coupler (106) and when the temperature is below the temperature set by control knob (109), the thermostat (104) turns the gas burner (105) on, while it turns the gas burner (105) off when thermo-coupler (106) indicates that the temperature is at or above the temperature set by control knob (109). There is also a pilot flame and electric igniter (107) that is used by the thermostat to turn on the gas burner (105).

This invention describes an intelligent water heater controller, which can adjust the water temperature intelligently. The intelligent water heater controller can use many inputs to learn the behavior of users over time. The controller is then able to predict when hot water is required and is able to turn the water heater on or off intelligently or to increase or reduce the temperature of the water heating element so that the hot water is available when needed while reducing the energy consumption. User is able to communicate with the water heater controller via smart phone, tablet or computer remotely to manually change and parameter or configuration of the controller. The controller is also able to communicate events to the user's smart phone, tablet or computer.

Figure 2:
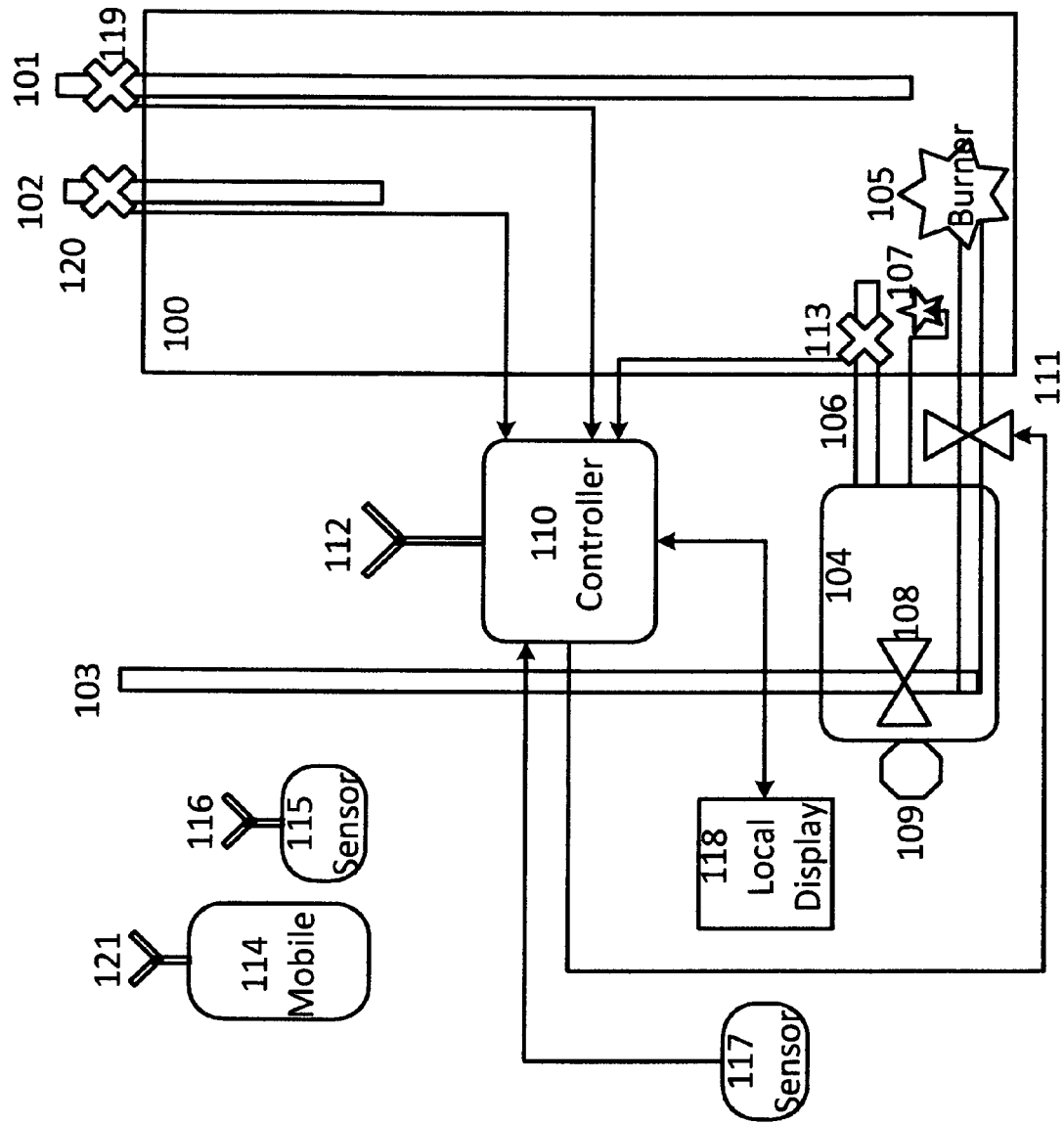
FIG. 2 is a schematic diagram of a conventional gas water heater with an added-on intelligent water heater controller that can receive input from many sensors and control the gas line via an electric valve and can be controlled wirelessly and remotely.

FIG. 2 shows an embodiment of this invention, in which an intelligent water heater controller (110) is connected to an existing conventional water heater (100), without removing the existing water heater thermostat (104). The intelligent water heater controller (110) has a temperature sensor (113) that is installed close to the thermo-coupler (106) so that the controller (110) can know at what water temperatures the thermostat (104) turns on and turns off. The controller (110) uses this information to automatically detect the manual changes to the preset temperature of thermostat (104). The minimum and maximum water temperature can be used in different services such as:

1—If the maximum temperature is too high, the controller (110) can send a warning message to the users' wireless devices (114, 115) informing them about the dangers of high temperature especially dangerous for children and can also shut down the gas or electric flow using the electric controlled valve or switch (111) to lower the temperature.

2—if the minimum temperature drops too low the controller (110) can send a warning message to the users' wireless devices (114, 115) informing them of a possible malfunction of the water heater, for example the pilot might have turned off or the gas flow might have been disrupted. In this situation the controller (110) can shut down the electric controlled valve or switch (111) to avoid possible gas leakage. Other usage of the minimum and maximum water temperature information is described below.

The intelligent water heater controller (110) can have electric controlled valve or switch (111) to turn the gas or electricity supply on or off, respectively, in order to control the water heater. In the case of a gas water heater, the electric controlled valve (111) is installed on the burner's (105) gas supply after the water heater thermostat (104) so that the pilot (107) gas supply is not disrupted when the electric controlled valve (111) is shut down. The intelligent controller (110) works as follows: When the intelligent controller (110) decides to make hot water, it turns on the valve/switch (111) for gas or electrical supply depending on whether the water heater is a gas or electric water heater, and then the existing water heater thermostat (104) will turn the water heater on if the temperature is below the pre-set value configured by control knob (109). However, when the intelligent controller decides to keep the water heater burner (105) off, it turns off the gas or electrical supply via the electric controller valve/switch (111) depending on whether the water heater is a gas or electric water heater, and then the existing water heater thermostat (104) is not able to turn the water heater on even if the temperature is below the pre-set value. The intelligent controller (110) can receive input from wireless devices (114, 115) such as mobile device and their antennae (116, 121) or wired devices (117, 118) such as control panel or motion sensors. It can also send information to wired devices (118) or wireless devices (114, 115) via its wireless transmitter (112). The intelligent controller (110) can read the water tank temperature via thermometer (113) and measure the temperature of input cold water via thermometer (119) and the temperature of output hot water via thermometer (120). The thermometer (120) is also used as the water flow meter.

In order to detect the follow of hot water, which is an indication of the hot water usage, the intelligent controller (110) continuously monitors the temperature of the thermometer (120). A quick increase of the temperature of the thermometer (120) within few seconds, for example, 2 degrees Celsius within 20 seconds, shows the flow of hot water. This increase of the temperature is in contrast to the gradual increase of temperature measured by thermometer (1130) as a result of the gas burner/electric heater (105) heating the water, which can be for example, 2 degrees Celsius increase within more than 200 seconds. After the water flow is stopped, the temperature of the water in output hot water pipe (102) drops relatively quickly, which enables the intelligent controller (110) to detect hot water usage stoppage and be ready for detecting the flow next time. Practically, when the hot water flow stops, the temperature of the sections of the hot water pipe (102) that is farther away from the water heater (100) drop faster than the sections of the hot water pipe (102) immediately adjacent to the water heater (100). Therefore, installing the thermometer (120) on the hot water pipe (102) farther away from the water heater (100) allows the thermometer (120) to sense the temperature drop faster and as a result be prepared to detect the next round of flow detection faster.

The thermometer (119) is used to measure the temperature of the input water to the water heater (100). This information is used by the intelligent controller (110) to predict how much time in advance it needs to turn on the water heater (100) such that the water is hot a ready for usage when it is needed. In the thermometer (119) shows lower temperatures the water heater needs to be turned much sooner in advance compare to the situation where the thermometer (119) shows higher temperatures as colder input water requires more time to warm up. Similarly, sensors such as sensor (117) can also measure ambient temperature and use this piece of information for the same purpose.

The electric controller valve/switch (111) is a normally open gas valve in the case of gas water heaters and a normally closed electric switch in the case of electric water heaters. This ensures the water heater can continue its normal operation in power outages and also if the intelligent controller (110) is unplugged (although the intelligent controller (110) may be battery powered or have backup battery). A normally open gas valued requires the intelligent controller (110) to continuously energize the valve to keep it closed when the water heater needs to be kept off. It is possible to save on the energy that is spent of energizing the electric controller valve/switch (111) by using the minimum and maximum water temperature information. The way it works is that, when the water temperature is above the maximum, the existing water heater thermostat (104) has already shut down the gas or electricity and therefore it is not necessary to also keep the electric controller valve/switch (111) energized. In such situation the intelligent controller (110) keeps monitoring the water temperature and only energizes the electric controller valve/switch (111) if the water heater should be keep off below the minimum temperature.

Figure 3:
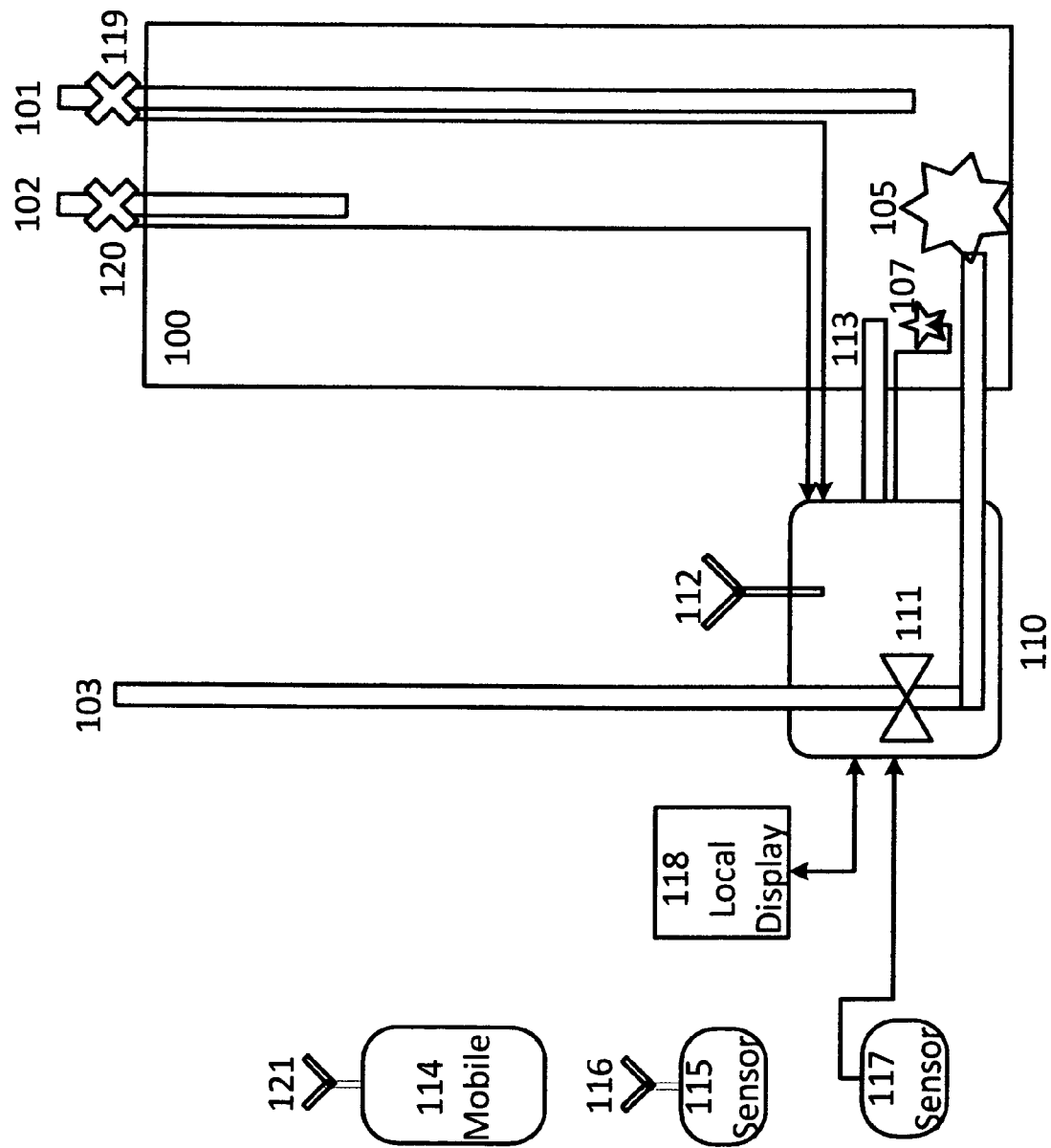
FIG. 3 is a schematic diagram of a new water heater which is controlled only with an intelligent water heater controller that can receive input from many sensors and turn the heater furnace on/off and can be controlled wirelessly and remotely.

In another embodiment of this invention shown in FIG. 3, the intelligent water heater controller replaces the existing thermostat. In such case the intelligent controller (110) has a thermometer (113) to measure the water temperature, an electric valve or switch (111) that turns the gas/electricity on/off and possibly a pilot or igniter control (107) to ensure that gas can be ignited when required.

One embodiment of this invention is a water heater controller that can receive input from many sources and use that information for learning the behavior of the user and for adjusting the hot water temperature accordingly. The sources can include, but not limited to, the following sources/inputs:
1. Local user commands and configurations via local panel (115, 118)
2. Remote user commands and configurations via smart phone or computer (114)
3. User calendar for determining travel, vacation, sports events, party attendance, and other events
4. Presence of users or guests in the house via sensors in the house or via the WiFi detection of their mobile phones
5. Location of users via GPS location of their phones or vehicles
6. Water tank thermometer that measures the hot water temperature (113)
7. Water flow meter that senses the hot flow (120)
8. Cold water temperature sensor (119)
9. Inside building and outside building temperature
10. Request from other appliances such as Dishwasher or Washer for hot water in advance to prepare the hot water for the appliances ahead of their scheduled usage.

Figure 6:
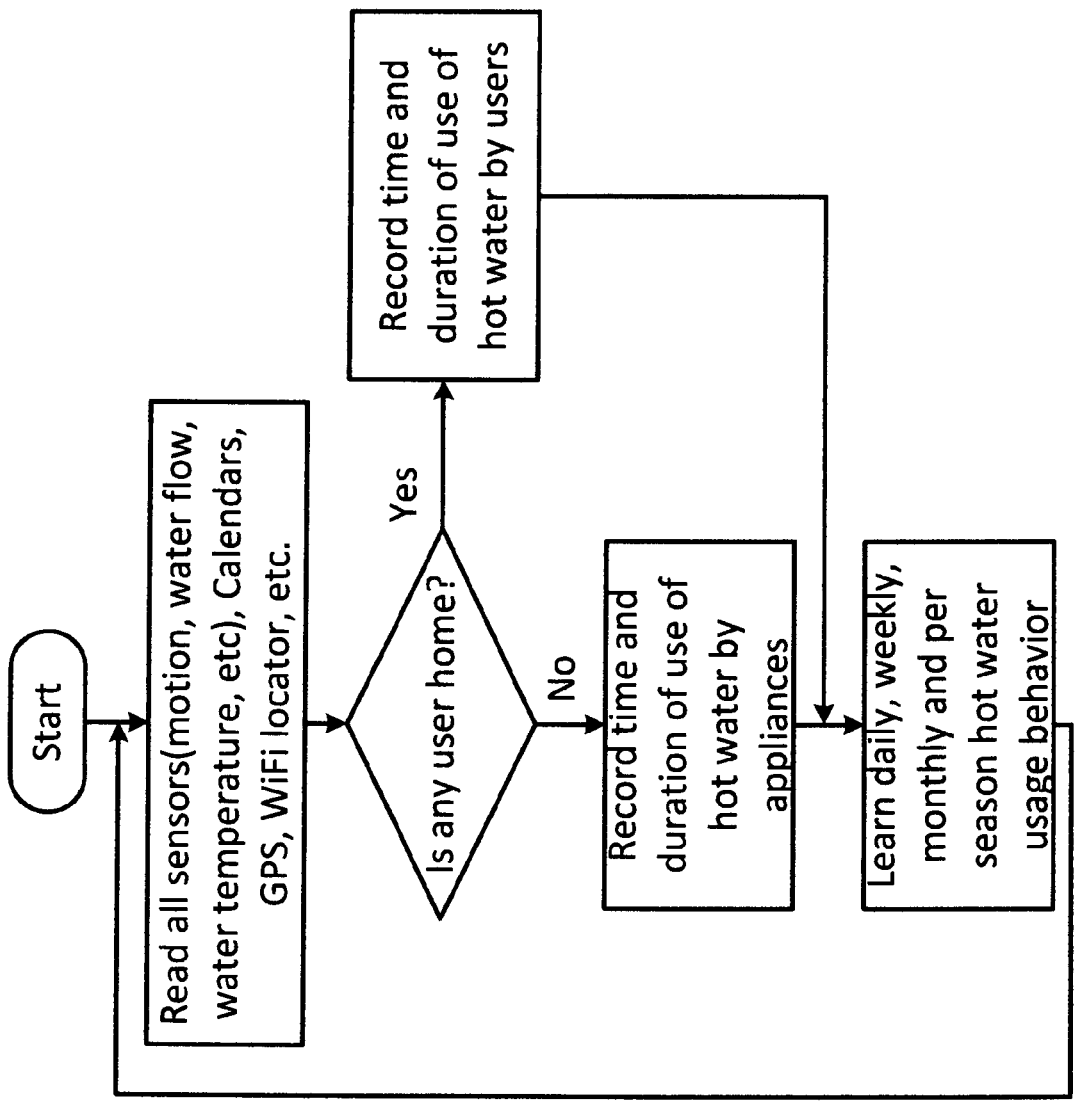
FIG. 6 is a flow diagram showing how the intelligent water heater controller learns the behavior of user and appliances requiring hot water.

One embodiment of this invention as shown in FIG. 6 is a water heater controller that learns the behavior of the users over time and uses that information to adjust the hot water temperature. Such behavior includes but is not limited to the following:
1. When the users usually take shower
2. When the users usually turn on the washer or dishwasher
3. When the users usually leave home to work, school, gym or other regular activities
4. When the users return from work, school, gym or other regular activities
5. Hot water usage during weekdays and weekends, month and seasons.

One embodiment of this invention is a water heater controller that can intelligently monitor the status of water heater and can provide on-demand or proactive diagnostics information and warning to the user via installed panel (118) or via wireless to user's smart phone or computer (114). The intelligent monitoring includes but not limited to the following parameters:
1. Present and past history of hot water temperature
2. Present and past history of hot water flow and usage
3. Excess water tank temperature
4. Condition of pilot or igniter
5. Condition of airflow to the water heater burner
6. Condition of exhaust
7. Status of gas or electricity lines In one embodiment of this invention, the water heater controller can send email or Text message to users to inform user of any failure or issues with the water heater such as pilot light or igniter problem, water overflow, problem with gas flow or absence of electrical current, problem with ventilation, etc.

In an embodiment of this invention, a water heater controller (110) can be installed on the water heater (100) or can be installed remotely on a wall using wired or wireless connection (118, 115) to the water heater thermostat. Such controller may have local display and controls and may have wireless connection to WiFi or Cellular network. The display/control device can locally monitor the status of the water heater and can configure the thermostat parameters.

A user may communicate with the controller wirelessly (WiFi or Cellular) via smart phone or computer. User could then see the status of the water heater, its temperature, whether it has any issues such as water overflow, excess temperature, water pressure lower or higher than normal, etc. The user may turn the water heater on or off or change configuration and settings of the water heater thermostat remotely via such smart phone or computer.

In an embodiment of this invention, the water heater controller can turn on or off the water heater or adjust the temperature of the heating element to achieve the desired temperature at lowest possible power consumption. For example the intelligent controller can increase or reduce the gas flow to a gas water heater (similar to a gas stove) or can increase or reduce electric current to an electric heating element in an electric water heater all within a safe hard limit.

In an embodiment of this invention, the intelligent water heater controller can run intelligent software to learn the behavior of the users and other appliances using hot water (such as washer and dishwasher) in the building during days of the week and during different months and seasons and apply that information to predict and control the water heater temperature. This can be done via learning repeating patterns and other methods. For example if all users in a home leave to work or school by 9:00 AM and return at 3:00 pm, the intelligent controller can learn this behavior and turn off or reduce the water heater temperature during the time that users are not usually home.

In an embodiment of the invention, the intelligent water heater controller can detect and learn specific water usage events such as shower, hand wash, washer or dish washer, via the temperature change profile and use that information for learning purpose. For example an adult person, taking shower will cause the hot water temperature in the tank to drop quickly, while washing hands causes short term small drop in hot water temperature.

Figure 5:
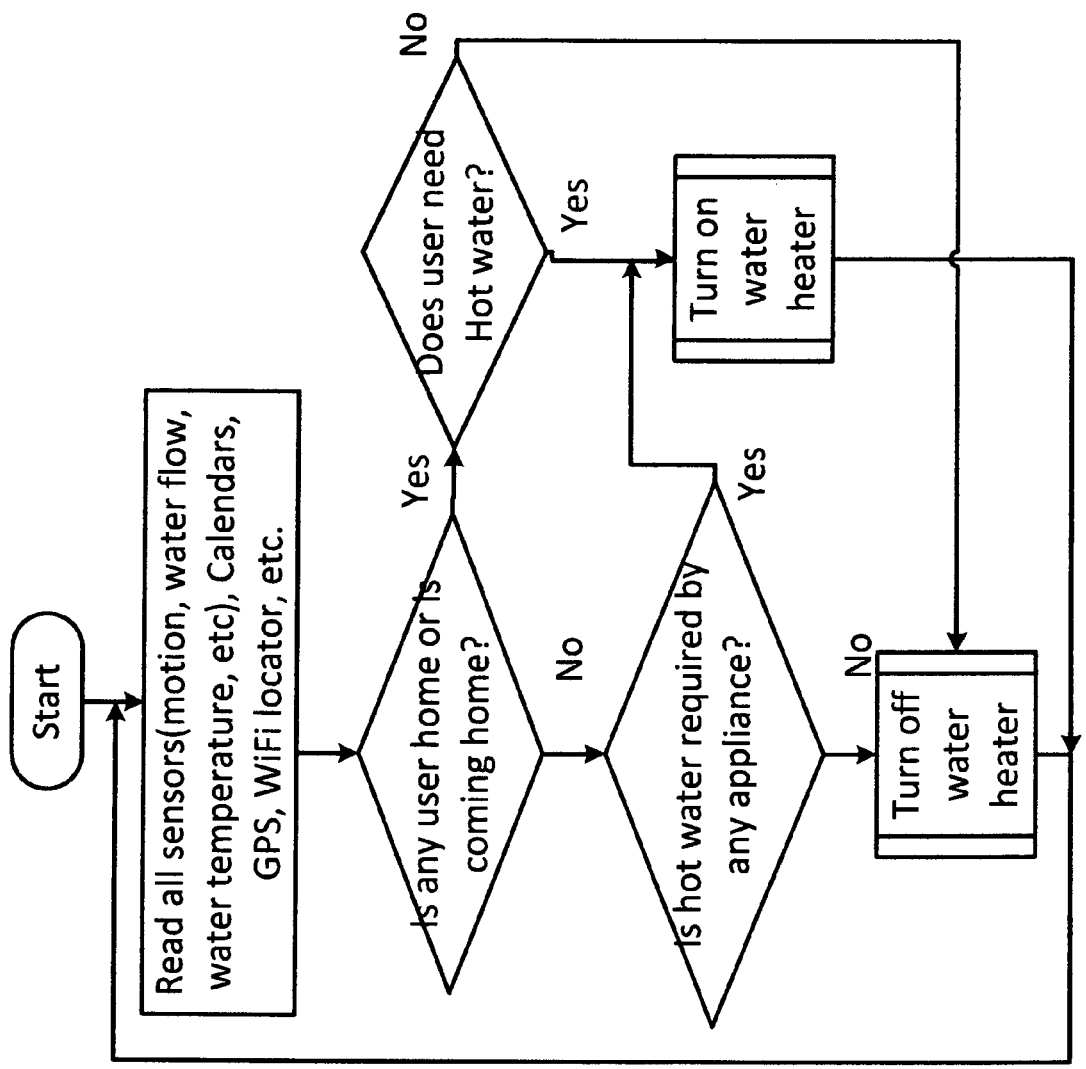
FIG. 5 is a flow diagram showing how the intelligent water heater controller decides to turn the water heater on or off.

In an embodiment of this invention as shown in FIG. 5, the water heater controller can detect the presence of users in the building via available inputs such as use of cold or hot water flow, sudden hot water temperature change, WiFi detection of the user smart phone, GPS location of the user's smart phone or car, motion sensor detection, etc. and use that information for learning user behavior and adjusting water temperature if required.

In an embodiment of this invention the intelligent water heater controller can be calibrated by itself (self-calibration) or by user to find out how long does it take for the water temperature to rise or fall by any degrees Celsius or Fahrenheit. This information can then be used to turn on or off the water heater or adjust the gas or electricity flow ahead of time before a certain temperature is desired. The water heater controller may also use the indoor temperature to predict the rate of decrease in hot water temperature and adjust its heating elements heating rate to the proper setting to compensate for heat loss.

In one embodiment of this invention, the water heater controller can access the household user's Internet-based calendars and identify events such as vacations, holiday trips, party invitations, family hiking or biking schedule, going to sports events, etc. and use that information to predict and adjust the hot water temperature.

In one embodiment of this invention, the water heater controller can send email or Text message to users and ask whether they plan to be home soon or when they plan to be home.

In one embodiment of the invention other appliances requiring hot water such as dishwasher or washer can communicate with the intelligent water heater controller wirelessly or wired and inform water heater controller that they require hot water at some specific time. The water heater controller can then ensure hot water is available for those appliances at the required time. In addition, if the water continues to be heated up, for example, while a user is taking a shower, the intelligent water heater controller (110) can communicate with the intelligent washer or the dishwasher to start using this heated water, as oppose to letting cool down, if they are ready to start, meaning that if they are already loaded and the user has dialed a smart wash setting, which allows the intelligent washer or the dishwasher to pick the best time that is more energy efficient to start the job.

In one embodiment of this invention, the user can set a daily, weekly or monthly goal/budget for the energy consumption of the water heater and the water heater controller will try to meet the goal and stay within the set budget.

Figure 4:
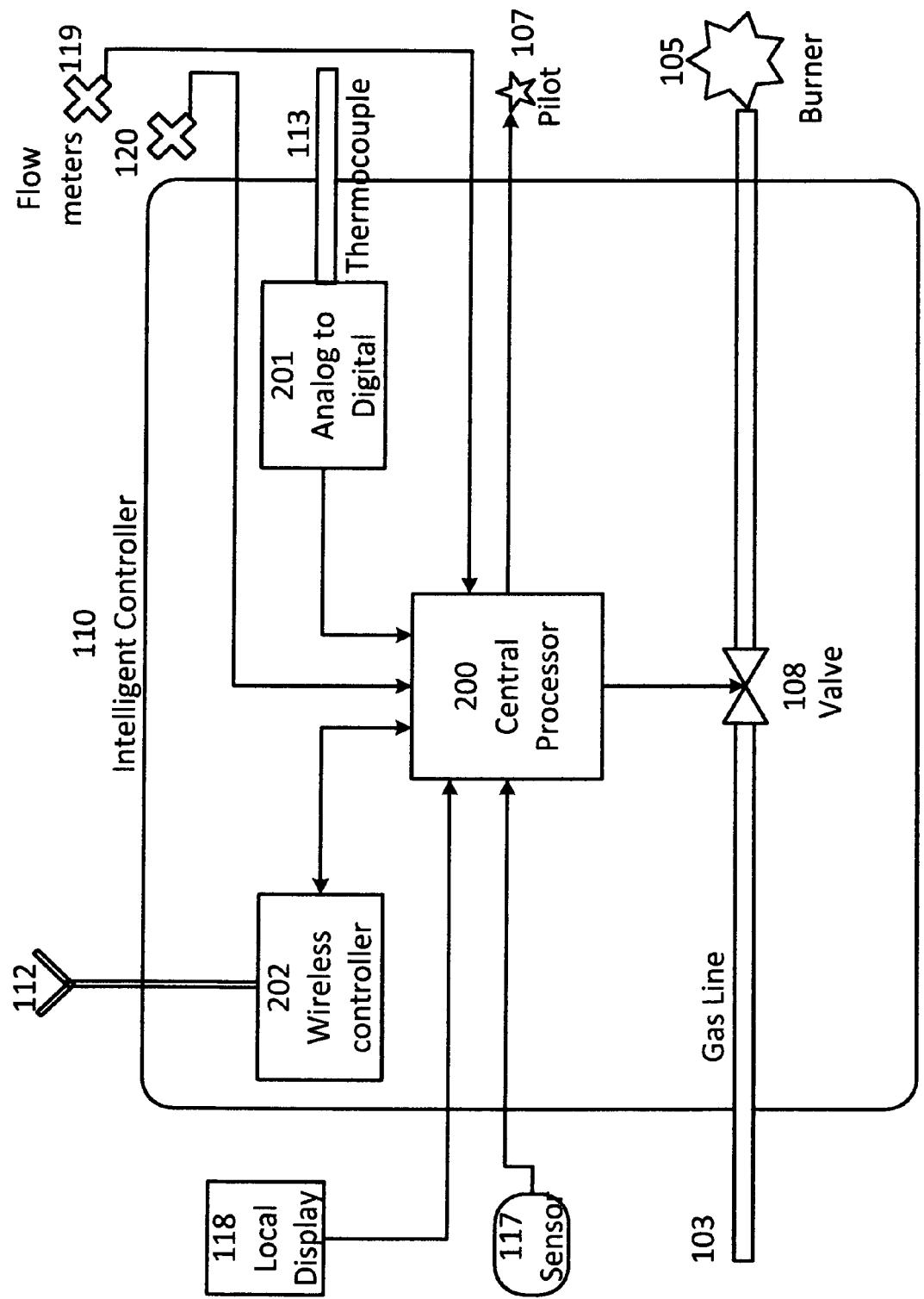
FIG. 4 is a schematic diagram of an intelligent water heater controller. It shows many inputs from wired and wireless sources such as temperature source, mobile phone, tablet, wired/wireless panel, WiFi, GPS, motion sensor, water flow sensor, thermometer, etc. as well as many outputs such as controlling the gas line, the pilot/igniter, communicating with wire and wireless devices.

An embodiment of the intelligent water heater controller (110) is as shown in FIG. 4. As can be seen from this figure, a water temperature sensor (113) is connected to a temperature-reading unit (201), which converts the analog signal to digital and feeds that information to the central processing unit CPU (200). Other inputs to the CPU (200) are the water flow sensors (119, 120), motion sensors (117), and external wired panel (118). The CPU can also communicate externally via wireless controller (202) and antenna (112). The CPU (200) can control the gas valve (108) that controls the flow of gas from main gas pipe (103) to the burner (105). CPU (200) also controls the pilot light or igniter (107).

Any variations of the above teaching are also intended to be covered by this patent application.

The invention claimed is:

1. A system for controlling the temperature of a water heater,
   said system comprising:
   a water tank;
   a heating element;
   a cold water and a hot water line;
   a hot water temperature sensor;
   a plurality of inputs;
   a water heater controller;
   a control panel;
   one or more users;
   wherein said water heater controller adjusts hot water temperature by turning said heating element on or off or by controlling the intensity of said heating element;
   wherein said water heater controller receives information from said plurality of inputs;
   wherein said water heater controller adjusts water temperature based on said information so that hot water is available when needed, while reduce said heating element use of energy by turning said heating element off or reducing said heating element's intensity when it is not required;
   wherein a group of said plurality of inputs detects the presence of said one or more users in a building; wherein said group of said plurality of inputs comprising of cold or hot water flow; sudden hot water temperature change; WiFi detection of the smart phones or vehicles of said one or more users; GPS location of said smart phones or vehicles of said one or more users; motion sensor detection of presence of said one or more users in said building.

2. A system as in claim 1, wherein said water heater controller uses indoor temperature to predict the rate of decrease in water temperature and adjust heating rate of said heating element to compensate for heat loss; wherein said water heater controller measures cold water temperature using a thermometer installed on said cold water line, to predict the time it takes for heating up water to a specific temperature.

3. A system as in claim 1, wherein said water heater controller can access said one or more users' calendars and identify events when said one or more users are outside of said building for extended period of time and use to predict and adjust said water heater temperature accordingly.

4. A system as in claim 1, wherein a home appliance communicates with said water heater controller and informs said water heater controller of the specific time said appliance requires hot water; wherein said water heater controller ensures hot water is available for said appliance at the said specific time.

5. A system as in claim 4, wherein said water heater controller can instruct said appliance to start using said hot water immediately in order to prevent the heat to be wasted.

6. A system as in claim 1, wherein said one or more users can set a daily, weekly or monthly goals and energy consumption budget for said water heater and said water heater controller adjusts said heating element so that said goal are not exceeded.

7. A system as in claim 1, wherein said water heater controller can coexist with existing thermostat, wherein said water heater controller has its own temperature sensor and controls, while said existing thermostat is set to the maximum temperature that said one or more users have configured.

8. A system as in claim 7, wherein said water heater controller monitors the temperature of water inside said water heater by monitoring a thermometer installed at the bottom of said water tank and measures the minimum and maximum temperature setting of said existing thermostat in order to optimize said water heater controller.

* * * * *